United States Patent

[11] 3,626,863

| | | |
|---|---|---|
| [72] | Inventor | Werner Trost<br>Duisburg-Wanheimerort, Germany |
| [21] | Appl. No. | 841,896 |
| [22] | Filed | July 15, 1969 |
| [45] | Patented | Dec. 14, 1971 |
| [73] | Assignee | DEMAG Aktiengesellschaft<br>Duisburg, Germany |

[54] RAILWAY VEHICLE STUB AXLE TRUCK
6 Claims, 5 Drawing Figs.

[52] U.S. Cl. ................................................. 105/180,
105/133, 105/163, 105/195, 105/209, 105/218 A
[51] Int. Cl. .................................................... B61d 15/00,
B61f 3/16, B61f 5/36
[50] Field of Search ........................................... 105/163,
194, 195, 196, 206, 209, 218 A, 133

[56] References Cited
UNITED STATES PATENTS

| 870,607 | 11/1907 | Amberg | 105/206 |
|---|---|---|---|
| 907,964 | 12/1908 | Brown | 105/163 X |
| 1,070,466 | 8/1913 | Hedgecock | 105/195 |
| 2,106,359 | 1/1938 | Pflager | 105/194 |
| 2,259,088 | 10/1941 | Sheehan et al. | 105/195 |

Primary Examiner—Arthur L. La Point
Assistant Examiner—Howard Beltran
Attorney—McGlew and Toren ABSTRACT: A transport vehicle particularly having a truck of a type adapted to be run over a track and including a multiple number of axles and which is useable for the movement of molten metals inside and outside of a metallurgical plant includes a central balancer beam member having a centrally arranged journal which is adapted to receive the load of the vehicle. The balancer beam is connected to hinge pins which are eccentrically arranged in respect to the axles of a supporting wheel on each side of the balancer beam. The pivot pins are formed as eccentric extensions around the shafts of the associated wheels, and they also carry rocker arm members which extend outwardly from the respective wheels and are supported on transverse members which are located centrally below the journal of the balancer beam. The load which is transmitted downwardly to the balancer beam through the journals is transmitted to the pivot pins of each wheel and thence through the rocker arm members which bear downwardly on the transverse members. The transverse members are supported on springs in a manner to permit their upward or downward movement. In one embodiment, the springs are supported on fixed elements carried by the balancer beam. In still another embodiment, the springs are supported upon extensions of bearings for a third wheel which is adapted to be positioned between the other two.

INVENTOR
Werner TROST
By

McGlew & Toren
his ATTORNEYS

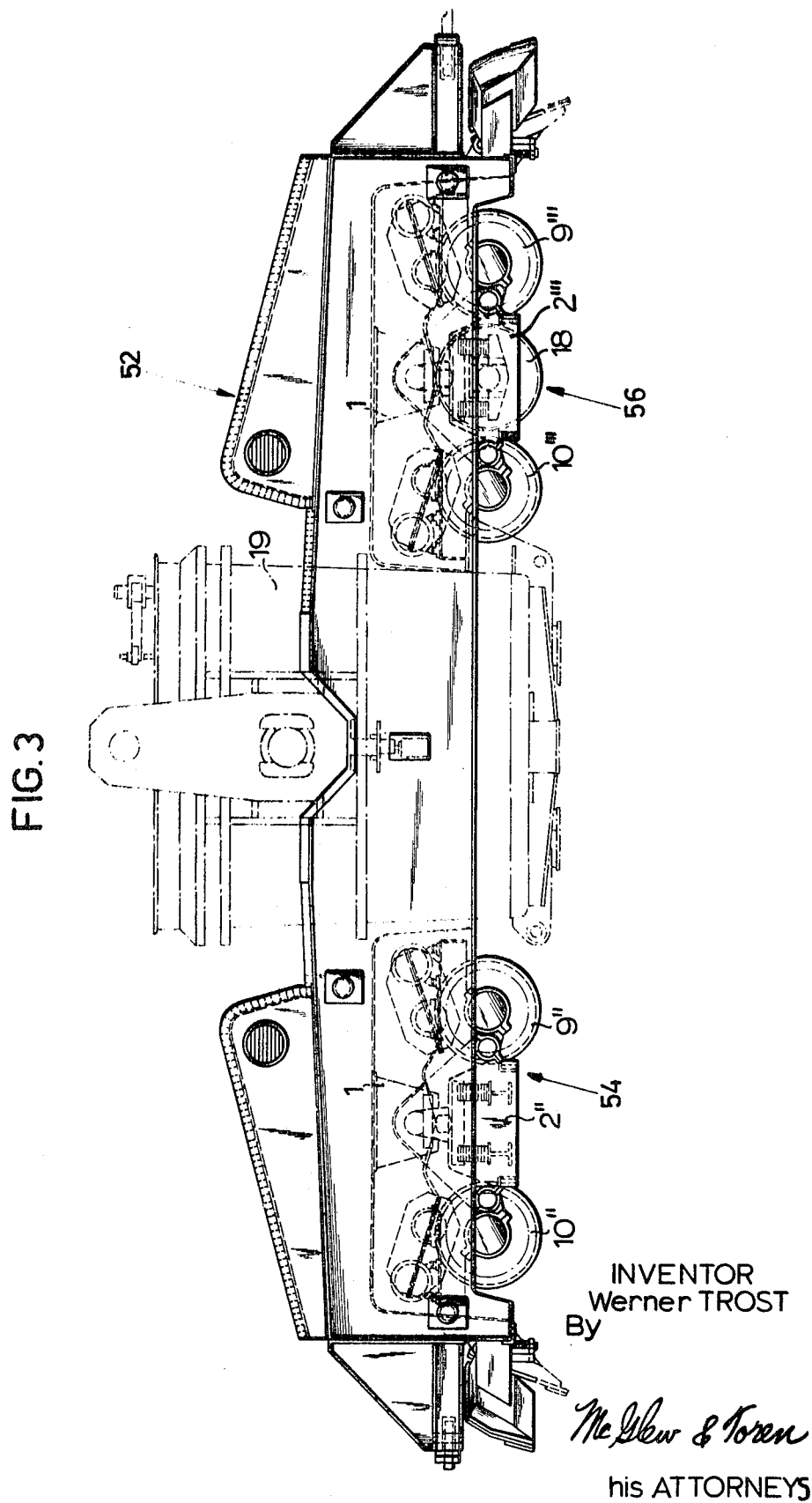

RAILWAY VEHICLE STUB AXLE TRUCK

SUMMARY OF THE INVENTION

This invention relates, in general, to the construction of transport vehicles and, in particular, to a new and useful multiaxle trackbound transport vehicle, particularly a steel discharging car, in which the vehicle load is supported by a central balancer beam carried on eccentric pivot pins which are formed on arms carried around each wheel bearing and which further transmits the sustaining load forces through rocker arms which act centrally on a transverse member disposed beneath the journals.

The possibilities for adapting vehicles to an increase of useful loads over their design loads are offset by the difficulty of having to increase the load on each wheel. A prerequisite for the evaluation of an admissible load increase is the knowledge of the extent of the original load. Exact values can only be determined with a statically defined support of the balancer beam for the wheel sets. Deviation from the track level occurs frequently in practice. The rail bed surface will usually show irregularities and signs of wear which appear gradually so that the wheel will swing on the rail laterally and at the same time in a vertical direction. A prerequisite, therefore, for additional load-supporting capabilities is the necessity of a statically defined support of the wheels within a wheel group, for example, by a balancer beam.

The calculation of the wheel and rail loading is based on the findings of the "Hertz" equation for surface pressure between planar and cylindrical bodies. In general, the compressive stress between the two parts must not be assumed as high as the Hertz stress because requirements of the type of operation, whether they be for light, normal or heavy use as well as variations in travel speed, have not been taken into consideration. If the wear is to be low during the operating time so that a great life expectancy can be assumed, the requirements regarding the performances must not be too high. Starting quantities for the calculation are the material quality of the wheel and the rail and the frequency with which the tracks are to be travelled as well as the travelling speed and the empirical values of admissible surface pressure. We obtain then an admissible wheel load for the prescribed operation. This maximum value of the wheel load must be maintained under all circumstances. Otherwise, the expected service life will not be obtained. Constant wheel loads can be obtained by statically defined wheel supports in practice. The known measures of avoiding high wheel loads by a great number of wheels fail when the uncertainty of the actually occurring load portions increase. In order to be on the safe side, the wheel grooves are therefore arranged on the balancer beams at the end of the vehicle. In this way, the unforeseeable irregularities in the track level can be overcome. An additional support in the center of the vehicle will already lead to an uncertainty of the wheel loads. This is true because the problem is not one of considering only one plane but two perpendicular planes. The second plane is formed by the track level itself. It happens frequently that equal wheel loads occur only when measured over the diagonal of the vehicle ground plane. These loads must necessarily be higher because the wheels of the other diagonals are partly relieved. Twisting of this chassis takes place only to a limited extent. The eccentric balancers beams articulated only in the two end regions of the car offer therefore the advantage of the wheel load distribution which is considered as sufficiently certain.

The present invention assumes a constant wheel load. The utilization of admissible stress under the required circumstances between the wheel and the rail determines thus the useful load of the car. Attempts, which were made particularly in the metallurgical industry, to increase the metal charge loads and to increase them again later on in the operation, continue. In cars which transport a ladle, for example, there are melt weights of 250 tons or more. The dimensioning of the chassis is less of a problem than the wheel pressure. Steel discharging cars which originally are designed only for fixed loads and therefore simple at the end of their usefulness. Even recently designed cars, whose chassis could carry higher useful loads, cannot transport greater weights because of inadmissible wheel loading pressures. The selection of a car suitable for high useful loads depends therefore on the solution of the problem of the wheel pressures.

In accordance with the present invention, the wheels are designed in respect to the rail to operate at the compressive stress limit and the construction is designed to provide clear load ratios in order to avoid the change of the wheel pressures in operation. Greater loads than were originally intended for the car are admissible according to the invention. This is possible by a construction which permits the adding of an additional wheel to each pair of load-bearing wheels which is articulated to a balancer beam. A feature of the arrangement is the fact that the construction permits the determining of the exact load portions which are borne by each wheel. The division of the load according to the invention into exactly determined load portions can be so effected that each wheel of a pair of successive individual wheels is suspended with its bearing on rocker arm elements. The rocker arm elements, in turn, are pivotally mounted on an eccentrically arranged pivot support of the balancer beam elements and bear centrally against a transverse member arranged below the support for the balancer beam. The rocker arm are such that they transmit their load-bearing supports in accordance with their selected arm lengths. As long as the admissible wheel pressure is not exceeded, the balancer beam absorbs all portions of the load. A car of this nature can be prepared for greater loads without any major alterations in accordance with a further feature of the invention. This may be accomplished by supporting the rocker arms centrally below the articulation for the balancer beam on bearings for a third wheel which is suspended therebetween. The balancer beam and rocker arm construction is such that it accommodates uneveness of the tracks and provides an elasticity of the wheel support and a force for restoring the wheels to their original position after being subjected to load. For this purpose, the rocker arms which are articulated to the pivots which support the balancer beam at eccentric locations on each wheel have arm-extending portions which rest on centrally arranged transverse members which are supported on springs.

It is possible to provide three equal wheel pressures for supporting the carriage load. This effect is achieved by making the longitudinal ratio of the different rocker arm lengths 1 to 2 in respect to the perpendicular to the weight force direction into the balancer beam with a horizontal position of the vehicle.

Accordingly, it is an object of the invention to provide an improved wheel support construction particularly for carriages for the ladles of molten metals in metallurgical plants, which includes a centrally arranged balancer beam having a journal arranged for receiving a vehicle load force, the balancer beam being suspended on pivot-bearing arms which extend around each wheel element on each side of the balancer beam and wherein a rocker arm is carried on each pivot arm element and includes an arm portion extending centrally and resting on a transverse member which is resiliently supported below an arm associated with each of the respective wheels.

A further object of the invention is to provide a wheeled vehicle which includes a central balancer beam pivotally suspended on journal pin arms extending inwardly from spaced wheel elements and a rocker arm member carried on the pivot pin arms which include arm portions which extend inwardly below the support for the balancer beam, and wherein the rocker arms are supported on resilient means on bearings for a third wheel which is suspended in the bearings centrally between the other two.

A further object of the invention is to provide a wheeled vehicle construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 3 is a side elevational view of a steel discharging car constructed in accordance with the invention.

GENERAL DESCRIPTION OF THE PREFERRED EMBODIMENTS

Figure 1:
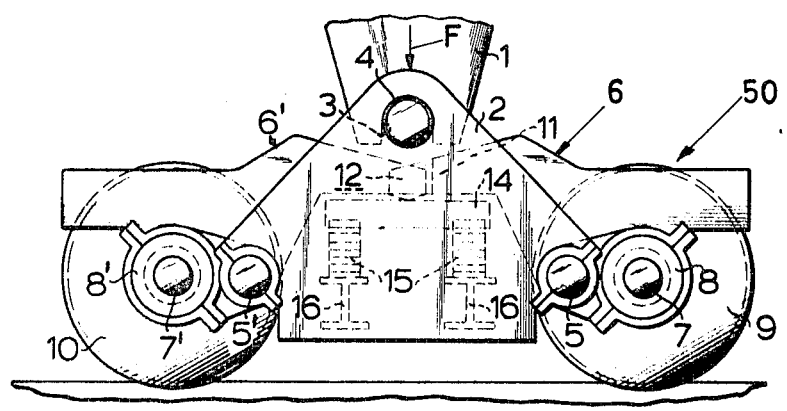
FIG. 1 is a partial side elevational view of a balancer beam for a statically defined two-wheeled support of a vehicle constructed in accordance with the invention.

Referring to the drawings, in particular, the invention embodied therein in FIG. 1 comprises, a wheeled support assembly generally designated 50 for supporting the load of a vehicle acting through a central support 1. The central support 1, which is secured on the chassis of the vehicle, transmits the weight load to a centrally arranged balancer beam 2 which comprises a generally triangular member having a journal 4 which extends transversely therefrom and is arranged to bear upwardly in a semicylindrical recess 3 of the support 1. The load and weight force F are transmitted downwardly by the balancer beam to hinge pins 5 and 5' which are formed on eccentric extensions or pivot arm members 8 which are carried on journal elements surrounding the axles 7 and 7' of wheels 9 and 10, respectively.

In accordance with the invention, rocker arm members 6 and 6' are supported on the respective pivots 5 and 5' and they include arm portions 11 and 12, respectively, which bear downwardly on transverse members 14 which are arranged below the journal 4. The transverse members 14 are supported on a common support comprising stacks of springs 15 on transversely extending beams or projections 16 carried on the balancer beam 2. The projections 16 are designed as double-T-girders and are bolted to the balancer beam 2 or otherwise mounted for easy detachment therefrom. The cup springs 15 are mounted to extend above the transoms 16 and they support each end of the common transverse member 14.

Figure 2:
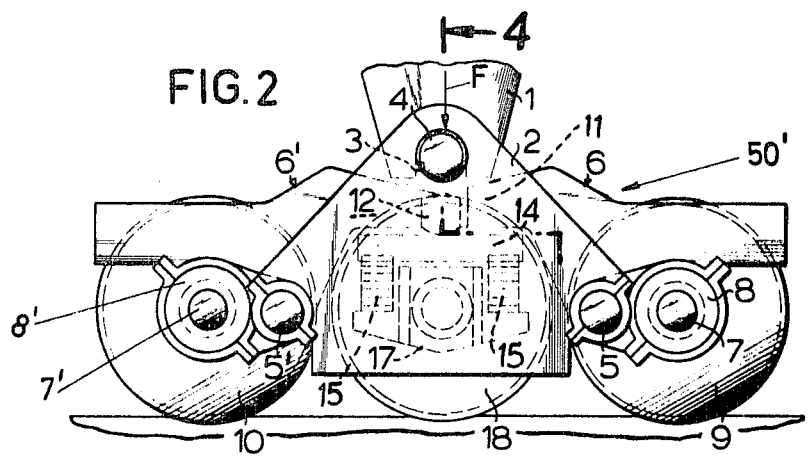
FIG. 2 is a view similar to FIG. 1 of another embodiment of the invention.
Figure 4:
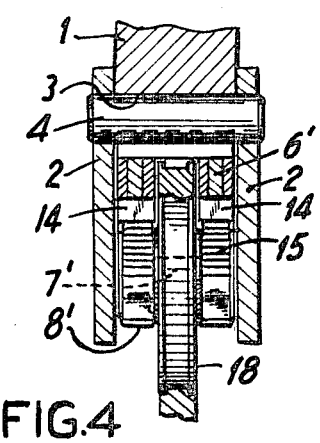
FIG. 4 is a sectional view on the line 4—4 of FIG. 2.
Figure 5:
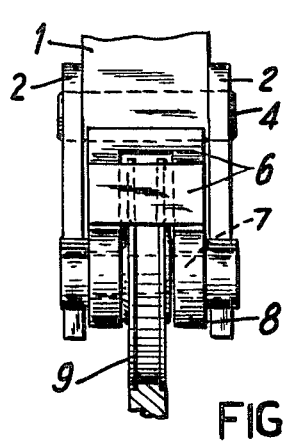
FIG. 5 is an elevational view of FIG. 2.

In the embodiment indicated in FIG. 2, the double-T-girders 16 can be removed and replaced by a bearing 17 suitable for mounting an additional wheel 18 as indicated. With such an arrangement, the spring elements for the modified vehicle support 50 are arranged to support the same transverse member 14 above the bearings 17. In the embodiment of FIG. 2, the same force F may be distributed through the balancer beam to the rocker arms 6 and 6' as in the embodiment of FIG. 1. This construction of FIG. 2, however, permits the introduction of additional forces through the transverse member 14 and into the cup spring packs 15 and the bearings 17 to the additional single wheel 18 disposed between the wheels 9 and 10.

It should be understood that a considerable increase of the useful load can be achieved by employing the third wheel 18 between the wheels 9 and 10 as indicated in FIG. 2. This construction may be carried out without any difficulty with respect to stress between the wheel and the rail and without any uncertainty which is a factor which must be considered with the known constructions. By an arrangement in which an exact determination of the load portions which are borne by each wheel can be reliably determined so that by practical measures it is possible to come closer to the Hertz compressive stress.

In the arrangement of the vehicle 52, indicated in FIG. 3, there are two suspension sets generally designated 54 and 56, respectively. The vehicle 52 is of a type for supporting a ladle 19 for molten metal, for example, for use in a metallurgical plant. The wheel suspension 54 and the left-hand side includes a balancer beam 2'' for supporting wheels 9'' and 10'' in a manner comparable to that indicated in FIG. 1. The wheel suspension 56 includes a construction for supporting wheels 9''' and 10''' and an additional third wheel 18 on journals carried centrally by the balancer beam 2'''. The use of the wheel 18 provides a greater capacity over the construction indicated on the left-hand side of FIG. 3. This means that the ladle 19 can also be filled to a greater capacity or a larger ladle substituted, if desired. The invention thus permits the increase of the useful load with which a vehicle can operate without having to accept uncontrollable signs of wear between the wheel and the rail.

What is claimed is:

1. A multiple-axle trackbound transport vehicle particularly a steel discharging car for moving inside and outside metallurgical plants, comprising at least one supporting wheel set including a central balancer beam adapted to receive the vehicle load force, said balancer beam having an eccentric pivot arm extension at each end, first and second wheels and axles respectively journaled on said extensions adjacent the respective ends of said balancer beam, a third wheel support connected to said balancer beam for supporting a third wheel between said first and second wheels, and supporting arm means carried on said extensions around the axles of said wheels on each end of said balancer beam and bearing upon said third wheel support and transmitting the load from said first and second wheels to said support for said third wheel.

2. A multiple-axle trackbound transport vehicle particularly for metallurgical plant use, comprising at least one balancer beam having a central journal for receiving the vehicle load and weight forces, first and second wheels arranged at respective ends of said balancer beam, first and second pivot arm extensions eccentrically supported on respective ones of said first and second wheels arranged at respective ones of said first and second wheels and connected to said balancer beam adjacent each respective end thereof, and a rocker arm carried on each of said pivot arm members on each of said first and second wheels at a location eccentric to the axis of the associated wheel, each rocker arm having an arm portion extending toward the other of said first and second wheels, a transverse member disposed between said first and second wheels, resilient supporting means connecting said transverse member to said balancer beam, said rocker arms extending downwardly onto said transverse member and distributing equal portions of said vehicle load and weight forces to said transverse member at a location between said first and second wheels.

3. A multiple-axle trackbound transport vehicle, according to claim 2, wherein said resilient supporting means carried by said balancer beam includes a transom adapted to be secured to said balancer beam, and spring means carried on said transom and supporting said transverse member.

4. A multiple-axle trackbound transport vehicle, according to claim 2, wherein said resilient supporting means includes a transom spring elements carried on said transom, said transverse member being supported on said spring elements, said rocker arms being adapted to bear equally and centrally on said transverse member from each respective first and second wheels.

5. A multiple-axle trackbound transport vehicle, according to claim 2, wherein said resilient supporting means comprises a third wheel bearing, and a third wheel rotatably supported on said third wheel bearing.

6. A multiple-axle trackbound transport vehicle, according to claim 5, including a spring disposed between third wheel bearing and said transverse member.

* * * * *